United States Patent
Dejnabadi et al.

(10) Patent No.: US 9,092,071 B2
(45) Date of Patent: Jul. 28, 2015

(54) CONTROL DEVICE WITH AN ACCELEROMETER SYSTEM

(75) Inventors: Hooman Dejnabadi, Renens (CH); Kamiar Aminian, La Tour-de-Peilz (CH); Nicolas Chauvin, Chexbres (CH)

(73) Assignee: Logitech Europe S.A., Morges (CH)

( * ) Notice: Subject to any disclaimer, the term of this patent is extended or adjusted under 35 U.S.C. 154(b) by 188 days.

(21) Appl. No.: 13/107,765

(22) Filed: May 13, 2011

(65) Prior Publication Data

US 2011/0288805 A1    Nov. 24, 2011

Related U.S. Application Data

(60) Provisional application No. 61/346,389, filed on May 19, 2010.

(51) Int. Cl.
| | |
|---|---|
| G06F 19/00 | (2011.01) |
| G06F 3/0346 | (2013.01) |
| G01P 7/00 | (2006.01) |
| G01P 15/18 | (2013.01) |
| G06F 3/0354 | (2013.01) |
| G06F 3/038 | (2013.01) |

(52) U.S. Cl.
CPC .............. *G06F 3/0346* (2013.01); *G01P 7/00* (2013.01); *G01P 15/18* (2013.01); *G06F 3/038* (2013.01); *G06F 3/03543* (2013.01)

(58) Field of Classification Search
CPC .......... G01P 7/00; G01P 15/18; G06F 3/038; G06F 3/03543; G06F 3/0346; G06F 19/00
USPC .............................. 702/96, 141, 142; 73/1.37
See application file for complete search history.

(56) References Cited

U.S. PATENT DOCUMENTS

| | | |
|---|---|---|
| 569,413 A | 10/1896 | Aoyagi et al. |
| 4,447,692 A | 5/1984 | Mierzwinski |
| 4,578,674 A | 3/1986 | Baker et al. |

(Continued)

FOREIGN PATENT DOCUMENTS

WO    WO2008/016387 A1    2/2008

OTHER PUBLICATIONS

Margopoulos, W.P.; "Correction of Drift in Rotating Apparatus"; 1958, *IBM Technical Disclosure Bulletin*, vol. 34, No. 11, 2 pages.

(Continued)

*Primary Examiner* — Mohamed Charioui
*Assistant Examiner* — Ruihua Zhang
(74) *Attorney, Agent, or Firm* — Kilpatrick Townsend & Stockton LLP (57) ABSTRACT

A control device includes a two-dimensional inertial system configured to measure an acceleration of the control device. A control circuit is coupled to the two-dimensional inertial system where the control circuit is configured to receive acceleration information for the acceleration measured by the two-dimensional inertial system. The control circuit is further configured to integrate the acceleration information to calculate the velocity of the control device and determine if the velocity of the control device becomes zero along one or both of the two dimensions for which the two-dimensional inertial system is configured to measure acceleration. The control circuit is further configured to correct a drift in the velocity if the control circuit determines that the velocity is zero along one or both of the two dimensions.

9 Claims, 5 Drawing Sheets

(56) References Cited

U.S. PATENT DOCUMENTS

| | | |
|---|---|---|
| 4,787,051 A | 11/1988 | Olson |
| 4,796,019 A | 1/1989 | Auerbach |
| 5,124,689 A | 6/1992 | Franz et al. |
| 5,363,120 A | 11/1994 | Drumm |
| 5,367,316 A | 11/1994 | Ikezaki |
| 5,440,326 A | 8/1995 | Quinn |
| 5,448,261 A | 9/1995 | Koike et al. |
| 5,543,758 A | 8/1996 | Wey |
| 5,554,980 A | 9/1996 | Hashimoto et al. |
| 5,673,066 A | 9/1997 | Toda et al. |
| 5,734,371 A | 3/1998 | Kaplan |
| 5,764,219 A | 6/1998 | Rutledge et al. |
| 5,825,350 A | 10/1998 | Case, Jr. et al. |
| 5,898,421 A | 4/1999 | Quinn |
| 5,963,145 A | 10/1999 | Escobosa |
| 6,069,594 A | 5/2000 | Barnes et al. |
| 6,069,614 A | 5/2000 | Singhal |
| 6,081,261 A | 6/2000 | Wolff et al. |
| 6,104,380 A | 8/2000 | Stork et al. |
| 6,147,677 A | 11/2000 | Escobosa et al. |
| 6,147,843 A | 11/2000 | Stephens et al. |
| 6,232,790 B1 | 5/2001 | Bryan et al. |
| 6,377,249 B1 | 4/2002 | Mumford |
| 6,603,420 B1 | 8/2003 | Lu |
| 6,661,410 B2 | 12/2003 | Casebolt et al. |
| 6,703,570 B1 | 3/2004 | Russell et al. |
| 6,721,831 B1 | 4/2004 | Lee |
| 6,750,801 B2 | 6/2004 | Stefanik |
| 7,136,045 B2 | 11/2006 | Rosenberg et al. |
| 7,209,116 B2 | 4/2007 | Gates et al. |
| 7,233,316 B2 | 6/2007 | Smith et al. |
| 7,386,463 B2 | 6/2008 | McCabe |
| 7,545,362 B2 | 6/2009 | Kong |
| 7,616,186 B2 | 11/2009 | Nilsson |
| 7,643,850 B2 | 1/2010 | Thijssen et al. |
| 7,688,307 B1 | 3/2010 | Tsyrganovich |
| 7,696,980 B1 | 4/2010 | Piot et al. |
| 7,817,136 B2 | 10/2010 | Shaft et al. |
| 7,872,639 B2 | 1/2011 | Theytaz et al. |
| 7,898,524 B2 | 3/2011 | Theytaz et al. |
| 8,441,434 B2 | 5/2013 | Vaananen et al. |
| 2002/0095317 A1 | 7/2002 | McCabe |
| 2002/0118131 A1 | 8/2002 | Yates et al. |
| 2004/0090423 A1 | 5/2004 | Bisset |
| 2004/0095317 A1 | 5/2004 | Zhang et al. |
| 2004/0189604 A1 | 9/2004 | Lee |
| 2004/0218104 A1 | 11/2004 | Smith et al. |
| 2005/0078087 A1 | 4/2005 | Gates et al. |
| 2005/0117130 A1 | 6/2005 | Bohn et al. |
| 2005/0181180 A1 | 8/2005 | Athanas et al. |
| 2006/0181521 A1 | 8/2006 | Perreault et al. |
| 2007/0188456 A1 | 8/2007 | Shaft et al. |
| 2007/0247427 A1 | 10/2007 | Huang et al. |
| 2009/0179869 A1 | 7/2009 | Slotznick |
| 2009/0295713 A1 | 12/2009 | Piot et al. |
| 2010/0073292 A1* | 3/2010 | Amm et al. .................. 345/163 |
| 2010/0103108 A1* | 4/2010 | Hotelling et al. ............ 345/166 |

OTHER PUBLICATIONS

Office Action for U.S. Appl. No. 12/030,813, dated Nov. 17, 2010.
Office Action for U.S. Appl. No. 12/030,813, dated Mar. 14, 2011.
Office Action for U.S. Appl. No. 12/130,883, dated May 3, 2011.
Non-Final Office Action for U.S. Appl. No. 12/720,606 mailed on Dec. 7, 2012, 14 pages.
Final Office Action for U.S. Appl. No. 12/720,606 mailed on May 22, 2013, 16 pages.
Non-Final Office Action for U.S. Appl. No. 12/130,883 mailed on May 13, 2013, 23 pages.
Chinese Office Action from China Intelectual Property Office for application CN200910145211.3 (Sep. 21, 2012).
Final Office Action for U.S. Appl. No. 12/130,883 mailed on Sep. 11, 2013, 20 pages.
Office Action from China Intellectual Property Office for application 201110139409.8 (May 24, 2013).
Chinese Office Action from China Intelectual Property Office for application CN201110139409.8 (Nov. 7, 2013).

* cited by examiner

CONTROL DEVICE WITH AN ACCELEROMETER SYSTEM

CROSS-REFERENCES TO RELATED APPLICATIONS

The present application claims benefit under 35 U.S.C. §119(e) of U.S. Provisional Patent Application No. 61/346,389, filed on May 19, 2010, and entitled "Control Device with an Accelerometer System." The present application is related to co-pending U.S. patent application Ser. No. 12/130,883, filed on May 30, 2008, entitled "Pointing Device with Improved Cursor Control In-Air and Allowing Multiple Modes of Operations" and U.S. patent application Ser. No. 12/030,813, filed Feb. 13, 2008, entitled "Pen Mouse." U.S. Provisional Patent Application No. 61/346,389 and U.S. patent application Ser. Nos. 12/130,883 and 12/030,813 are hereby incorporated by reference in their entirety for all purposes.

BACKGROUND OF THE INVENTION

The present invention relates to control devices. More particularly, the present invention relates to computer mice having accelerometers to detect motion.

Inertial systems are used in a number of devices such as airplanes, satellites, automobiles, ships, and the like to aid in determining the orientation of these devices in space, orienting these devices in space, and navigation. Inertial systems typically need to be calibrated on a periodic basis to correct for drift accumulated over time. Drift includes the inaccurate reporting of velocity, distance traveled, location, angular velocity, and orientation over time. Drift inaccuracies for velocity occur from errors in the measurement of acceleration and the integration of acceleration to calculate the velocity. As the acceleration is integrated the error is also integrated. The drift is compounded further for distance traveled and location where velocity and the errors in the velocity are integrated. Because a new distance traveled or new location is calculated from a previously calculated distance traveled or location, drift accumulates and increases at a rate roughly proportional to the temporal length of accumulation of acceleration measurements. Therefore, the drift must be periodically corrected so that correct velocity, distance, angular velocity, and orientation may be determined. Drift is often corrected for an airplane or the like by determining actual location and actual velocity by taking a reading from a global positioning system (GPS).

Zilog U.S. Pat. No. 7,688,307 describes "an accelerometer-based mouse." It describes "A mouse control unit generates a cursor movement disable signal that stops the cursor from moving from the time the mouse is lifted until the mouse is set down. The mouse control unit generates the disable signal by determining the derivative of an acceleration signal for the vertical (z) dimension relative to the working surface."

Lucent U.S. Pat. No. 5,734,371 describes: "An interactive video/computer pointing system utilizing a magnetic sensor to derive relative azimuthal information, and an inclinometer or accelerometer to provide relative angular elevation information. The azimuthal information is processed to yield an indication of any horizontal movement of the pointing device, and the angular elevation is processed to yield an indication of any vertical movement of the pointing device. This horizontal and vertical movement information is utilized to responsively control a video cursor, thereby enabling the user to point to and select various regions upon a video screen by manipulating the pointing device."

Tektronix U.S. Pat. No. 4,787,051 describes: "A hand-held inertial mouse provides input data to a computer from which the computer can determine the translational and angular displacement of the mouse. The mouse includes accelerometers for producing output signals of magnitudes proportional to the translational acceleration of the mouse in three non-parallel directions. Pairs of these accelerometers are positioned to detect acceleration along each axis of a Cartesian coordinate system such that an angular acceleration of the mouse about any axis of rotation causes representative differences in the magnitudes of the output signals of one or more of these accelerometer pairs. The translational velocity and displacement of the mouse is determined by integrating the accelerometer output signals and the angular velocity and displacement of the mouse is determined by integrating the difference between the output signals of the accelerometer pairs."

Sony Ericsson U.S. Pat. No. 7,616,186 describes: "An acceleration reference device comprises an accelerometer that is configured to generate acceleration information that is indicative of movement of the device; a communication interface that is configured to be communicatively coupled to a proximately located computer; a controller that is configured to generate movement information based on the acceleration information from the accelerometer and to communicate the acceleration information through the communication interface to the proximately located computer. The acceleration reference device cooperates with a cellular communication terminal configured to function as a mouse for the proximately located computer or for itself. Related terminal systems and methods are disclosed for using the device to provide mouse type functions." See also Sony Ericsson U.S. Pat. No. 7,643,850.

Several patents and publications describe detection of movement in 3D and/or detection of movement in air, and using this detected movement to control cursor movement on an associated display. U.S. Pat. No. 5,543,758 describes a remote control that operates by detecting movement of the remote control in space including detecting circular motions and the like. U.S. Pat. No. 6,104,380 describes a control device for controlling the position of a pointer on a display based on motion detected by a movement sensor. U.S. Pat. No. 5,554,980 describes a mouse that detects 3D movement for controlling a cursor on a display. U.S. Pat. No. 5,363,120 claims a system and a method for a computer input device configured to sense angular orientation about a vertical axis. The detected orientation is used to control a cursor position on a screen. U.S. Pat. No. 4,578,674 shows a wireless (ultrasonic) pointer that can also be operated in 3 dimensions. Also, U.S. Pat. No. 4,796,019 shows a wireless handheld pointer to control a cursor by changing angular position using multiple radiation beams. IBM Technical Disclosure Bulletin Vol. 34, No. 11 describes a Gyroscopic Mouse Device that includes a gyroscope that is configured to detect any movement of a mouse to control a cursor on a display. U.S. Pat. No. 5,898,421 describes a gyroscopic mouse method that includes sensing an inertial response associated with mouse movement in 3D-space. U.S. Pat. No. 5,440,326 describes a gyroscopic mouse configured to detect mouse movement in 3D-space, such as pitch and yaw. U.S. Pat. No. 5,825,350 describes a gyroscopic mouse configured to detect mouse movement in 3D-space. U.S. Pat. No. 5,448,261 describes a mouse configured to move in 3D space. U.S. Pat. No. 5,963,145, U.S. Pat. No. 6,147,677, and U.S. Pat. No. 6,721,831 also discuss remote control orientation. U.S. Pat. No. 6,069,594 shows a mouse that moves in 3 dimensions with 3 ultrasonic, triangulating sensors around the display. U.S. Published Application 2005/0078087 is directed to a device which acts as a mouse for a PC when on a surface, detects when it is lifted, then acts as a remote control for appliances. U.S. Published Application 2004/0095317 also discloses a remote control that can be used to control a television and a computer system.

A traditional 3D mouse, such as the traditional mice described briefly above, does not provide the same level of accuracy in determining mouse movement as compared to a mouse having an optical tracking system. Therefore, a 3D mouse used on the same desktop surface as a 2D mouse is typically less accurate in controlling a cursor or the like as compared to a mouse having an optical tracking system. Therefore, new control devices are needed that include inertial systems and provide high accuracy in determining mouse velocity and distance traveled.

SUMMARY OF THE INVENTION

The present invention generally provides a position detection system for a pointing device using microelectromechanical systems (MEMS) technology. More particularly, two-dimensional movement is detected, with an accelerometer in the z direction being used to detect lift-off of the pointing device to stop cursor movement.

In an embodiment, a control device includes a two-dimensional inertial system configured to measure an acceleration of the control device in a first dimension and in a second dimension and a control circuit coupled to the two-dimensional inertial system. The control circuit is configured to receive first acceleration information for the acceleration of the control device in the first dimension, receive second acceleration information for the acceleration of the control device in the second dimension, integrate the first acceleration information to calculate a first velocity of the control device along the first dimension, and integrate the second acceleration information to calculate a second velocity of the control device along the second dimension. The control circuit is also configured to determine that at least one of the first velocity or the second velocity equals zero and correct a drift in at least the first or second velocity. The control circuit is further configured to determine that at least the first velocity or the second velocity equals zero in response to the control device changing a direction of motion under user control.

In an embodiment, the control device comprises an optical tracking system configured to track movement of the control device across a surface and output data. The control circuit is further configured to determine that an accuracy associated with the data is higher than an accuracy associated with the first acceleration information or the second acceleration information and transmit the data to a computer. In another embodiment, the control device is configured to determine that an accuracy associated with at least the first acceleration information or the second acceleration information is higher than an accuracy associated with the data where the control device transmits at least one of the first acceleration information or the second acceleration information to a computer. In yet another embodiment, the optical tracking system is further configured to determine a first distance traveled by the control device. The control circuit is configured to determine a second distance traveled by the control device using the first velocity and the second velocity. The embodiment is further configured to average the first distance and the second distance to calculate an average distance traveled by the control device and transfer the average distance to a computer in communication with the control device. In an embodiment, the average distance is a weighted average distance.

In another embodiment, the two-dimensional inertial system is further configured to detect a vibration of the control device during movement across a surface, detect that the vibration equals zero, and correct the drift of at least the first velocity or the second velocity.

In a further embodiment, a control device includes a two-dimensional position detection system including Micro Electro-Mechanical Systems (MEMS) accelerometers for a first direction and a second direction. The first direction and second direction are substantially orthogonal to each other. A third direction MEMS accelerometer is configured to provide an output. The third direction is substantially orthogonal to the first direction and the second direction. A control circuit is configured to provide a movement signal representing movement in the first direction and the second direction. The control circuit is operable to inhibit the movement signal in response to the output of the third direction MEMS accelerometer. The control device is configured to operate on a surface which may include a surface area in the first direction and the second direction. The control device is further configured to inhibit the movement signal in response to a lifting-off of the control device from the surface. The control circuit is further configured to determine a movement in the first or second direction based on a frequency or amplitude of vibration of the control device and determine a movement in the first or second direction based on an optical tracking system.

In an embodiment of the present invention, a method, performed by a control circuit, for tracking a control device, includes determining a first velocity of the control device with a first tracking system, and determining a second velocity of the control device with a second tracking system. In another embodiment, the first and second tracking systems are tracking the velocity of the control device substantially concurrently. The method further includes determining a first weighted value by comparing the first velocity with a predetermined threshold velocity and determining a second weighted value by comparing the second velocity with the predetermined threshold velocity. The embodiment further includes multiplying the first velocity by the first weighted value, multiplying the second velocity by the second weighted value, and calculating an average velocity based on the first velocity, first weighted value, second velocity, and second weighted value. In another embodiment, the first system is one of an optical, inertial, and vibrational tracking system. The second system is also one of an optical, inertial, and vibrational system, but different from the first system. The control circuit is configured to increase the first weighted value when the first velocity is provided by the inertial tracking system and the first velocity is above the predetermined threshold velocity. The control circuit is configured to decrease the first weighted value when the first velocity is provided by the inertial tracking system and the first velocity is below the predetermined threshold velocity. Furthermore, the control circuit is configured to increase the first weighted value when the first velocity is provided by the vibrational tracking system and the first velocity is above the predetermined threshold velocity. The control circuit is further configured to decrease the first weighted value when the first velocity is provided by the vibrational tracking system and the first velocity is below the predetermined threshold velocity.

In one embodiment, movement vibration is reduced using a mechanical filter or damper inside the pointing device or mouse. In another embodiment, an adaptive filter uses the speed of the pointing device or mouse to compensate for the error.

A control device, according to one specific embodiment of the present invention, includes a two-dimensional inertial system configured to measure acceleration of the control device. The control device further includes a control circuit coupled to the two-dimensional inertial system. The control circuit is configured to: i) receive acceleration information for the acceleration measured by the two-dimensional inertial system, ii) integrate the acceleration information to calculate the velocity of the control device, iii) determine if the velocity of control device becomes zero along one or both of the two dimensions for which the two-dimensional inertial system is configured to measure acceleration, and iv) correct a drift in the velocity if the control circuit determines that the velocity is zero along one or both of the two dimensions. The velocity along one or both of the two dimensions is zero if the control device changes a direction of motion under user control.

According to one specific embodiment of the control device, the inertial system includes microelectromechanical systems (MEMS) accelerometers for measuring acceleration of the control device along the two dimensions. The two dimensions are parallel to a bottom or bottom surface of the control device. In another embodiment, the two dimensions are parallel to the surface which the control device is operating on. According to another specific embodiment of the present invention, the control device is a mouse.

According to another specific embodiment, the control device further includes another tracking system, such as an optical tracking system, configured to track movement of the control device across a surface. The control circuit is configured to direct the output of data from the optical tracking system or the inertial system to a computer based on the whether the other (e.g., optical) tracking system or the inertial system is providing higher accuracy tracking results.

According to another specific embodiment, the control circuit is configured to average a velocity determined from the optical tracking system and the velocity determined from the inertial system. The average of the velocity may be a weighted-average. The control circuit is also configured to average a distance traveled by the mouse determined by the optical tracking system and the distance traveled by the mouse determined from the inertial system. The average of the distance may be a weighted average. In a further embodiment, the control circuit is configured to average the acceleration determined from the optical tracking system and the inertial system, where the average of the acceleration may be a weighted acceleration.

According to another specific embodiment, the two-dimensional inertial system is configured to detect a vibration of the control device moving as the control device moves across a surface, and the control circuit is configured to correct the drift of the velocity if the control circuit detects that the frequency or the amplitude of the vibration goes to zero. The frequency of the vibration is correlated to a velocity of the control device, and if the velocity determined from the frequency is substantially the same as the velocity determined by the control circuit, the control circuit is configured to correct the drift of the velocity determined by the control circuit from the acceleration information. In one embodiment, the control circuit is configured to average a weighted sum of the velocity determined from the frequency of the vibration and the velocity determined by the control circuit from the acceleration information. In one embodiment, the control circuit is configured to weight more the velocity determined from the frequency of the vibration if the acceleration is at or below a threshold acceleration, and is configured to weight more the velocity determined by the control circuit from the acceleration information if the acceleration is above the threshold acceleration.

According to one embodiment of the present invention, a control device includes a two-dimensional position detection system including Micro Electro-Mechanical Systems (MEMS) accelerometers for x and y directions; a z-direction MEMS accelerometer; and a control circuit for providing a movement signal in two directions, said movement signal being inhibited in response to an output of said z-direction MEMS accelerometer.

In an embodiment, the control circuit is configured to determine that at least the first velocity or the second velocity equals zero in response to the control device changing a direction of motion under user control.

These and other benefits of the embodiment of the present invention will be realized by review of the following detailed description, attached claims, and attached drawings.

DETAILED DESCRIPTION OF THE INVENTION

The present invention provides a position detection system for a pointing device using microelectromechanical systems (MEMS) technology. In an embodiment, two-dimensional movement is detected, with an accelerometer in the z direction being used to detect lift-off of the pointing device to stop cursor movement.

Figure 1:
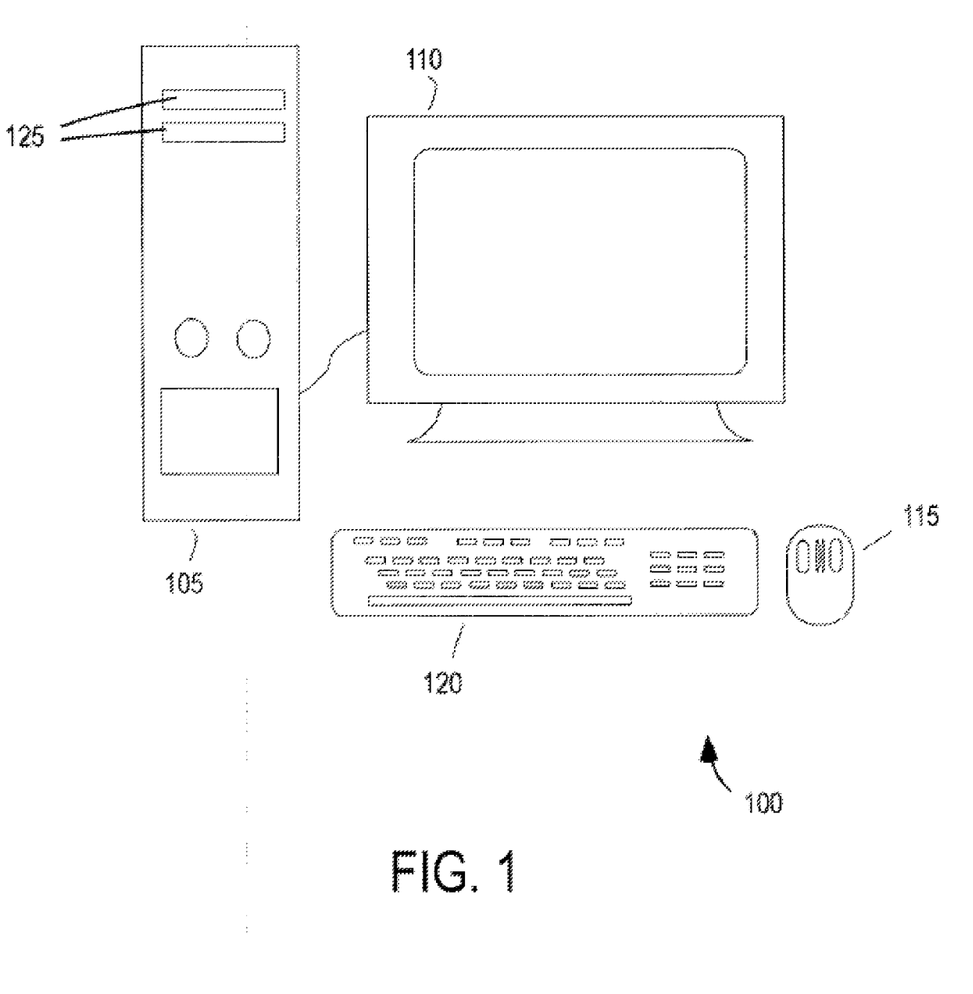
FIG. 1 is a simplified schematic of a computer system according to one embodiment of the present invention.

FIG. 1 is a simplified schematic of a computer system 100 according to one embodiment of the present invention. Computer system 100 includes a computer 105, a monitor 110, and a control device 115, such as a mouse, a puck, or the like. For convenience, the control device is referred to as a mouse herein, but it is to be understood the embodiments of the present invention are not limited to mice, and may include other devices, such as, but not limited to, remote controls, etc. The computer system may also include a keyboard 120 or the like. For computer system 100, the mouse and the keyboard are configured to control various aspects of computer 105 and monitor 110. For example, mouse 115 is configured to provide controls for page scrolling, cursor movement, selection of on screen items, and the like. Computer 105 may include a machine readable medium 125 that is configured to store computer code, such as mouse driver software, keyboard driver software, and the like, where the computer code is executable by a processor of the computer to affect control of the computer by the mouse and keyboard.

Figure 2:
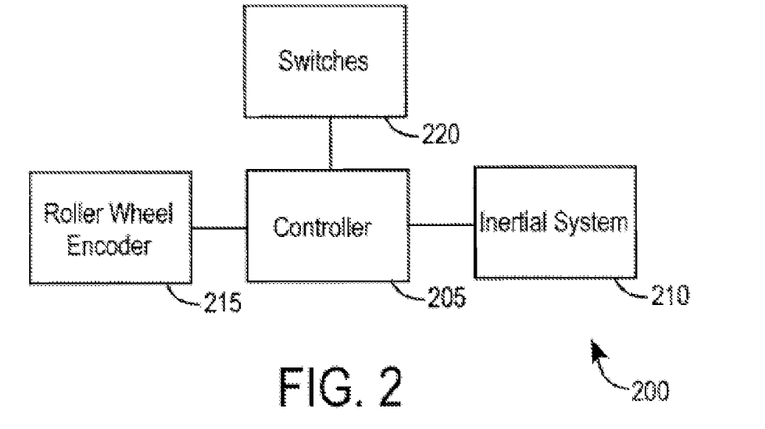
FIG. 2 is a simplified schematic of a circuit that is included in the mouse shown in FIG. 1 according to one embodiment of the present invention.

FIG. 2 is a simplified schematic of a circuit 200 that is included in mouse 110 according to one embodiment of the present invention. Circuit 200 includes a controller 205 (or alternatively a processor), an inertial system 210, a roller wheel encoder 215, and a set of switches 220 configured to detect key presses, button presses, etc. Some components, such as the roller wheel encoder 215, are optional. The inertial system is configured to measure the acceleration of the mouse as the mouse is moved. Controller 205 is configured to receive acceleration information collected by the inertial system, calculate the velocity of the mouse as the mouse is moved, and calculate the distance the mouse has moved from the calculated velocity. The calculation of the velocity may include integrating the acceleration over time, and calculation of the distance may include integrating the velocity over time.

Various embodiments of the present invention are directed to correcting drift for the inertial system. For mouse 115 including inertial system 210, drift in distance traveled by the mouse may manifest itself as the on-screen cursor moving an amount more or less than intended. Drift in velocity of the mouse may manifest itself in a cursor moving faster than intended and possibly moving in a direction that is not intended. Drift in velocity may also manifest itself in the cursor continuing to move after the mouse has stopped moving.

In an embodiment, the inertial system is a two-dimensional (2D) inertial system configured to measure the acceleration along two axes, which are typically orthogonal. In some embodiments, the two axes may be non-orthogonal. The two axes are referred to herein as the x-axis and the y-axis for convenience. Both the x-axis and the y-axis are substantially parallel to the bottom of the mouse or the bottom surface of the mouse. Because the x-axis and the y-axis are substantially parallel to the bottom surface of the mouse (i.e., control device), these two axis are also substantially parallel to a surface across which the mouse may be moved to control a computer function, such as controlling a cursor or the like. According to one alternative embodiment, the inertial system may be a three-dimensional (3-D) inertial system configured to measure acceleration along three axes, which are typically orthogonal to one another. Two of the three axes may be the x-axis and the y-axis, and the third axis is substantially perpendicular (i.e., orthogonal) to the x-axis and the y-axis. The third axis is referred to herein as the z-axis.

The inertial system may include a variety of accelerometers, such as microelectromechanical system (MEMS) accelerometers. The inertial system may include one or more MEMS accelerometers for each of the x-axis, the y-axis, and z-axis. According to one embodiment of the present invention, the drift of the inertial system is corrected by controller 205 by detecting the velocity of the mouse going to zero along one or more of the x-axis, the y-axis, and z-axis. If the velocity of the mouse becomes zero along one or more of these three axes, the actual velocity of the mouse is known along one or more of the three axes. Therefore, the velocity determined by the controller from integrating the acceleration information received from the inertial system may be set to zero and the drift eliminated. Thereafter, the controller may calculate the distance the mouse has traveled by integrating the velocity with the corrected drift in the velocity. For the sake of illustration, it is generally not feasible to correct drift of a vehicle (e.g., car, plane, etc.) by detecting a zero velocity event because a vehicle typically travels for a substantially long time (e.g., more than five seconds) in a single direction. The drift for a vehicle typically needs to be corrected while the vehicle is moving. However, a mouse often changes direction within a relatively short period of time (e.g., less than a few seconds). Therefore, providing controller 205 with the correct drift based on the mouse stopping along one or more of the x-axis, the y-axis, and z-axis is feasible. While the foregoing describes that controller 205 is configured to calculate the velocity, the distance traveled, and correct the drift, alternatively a host with which the control device 115 communicates (e.g., the computer 105) may be configured to perform the described determination of velocity, distance traveled, and correct the drift.

According to another embodiment of the present invention, the inertial system is configured to detect vibration of the mouse as the mouse is moved across a surface. In an embodiment, the amplitude and the frequency of the vibration of the control device are correlated with the velocity. The mouse generally vibrates with a relatively high frequency and high amplitude as the mouse is moved relatively quickly across a surface. The mouse vibrates with a relatively low frequency and low amplitude as the mouse is moved relatively slowly across a surface. In other words, if the velocity of the control device increases, the amplitude and frequency of the vibration increases, according to an embodiment of the invention. Conversely, if the velocity of the control device decreases, the amplitude and frequency of the vibration decreases, according to an embodiment of the invention. According to another embodiment, the controller tracks the vibrations detected by the inertial system. In an embodiment, the controller tracks the vibrations by measuring one or more of the amplitude and the frequency of the vibrations. If the vibration (i.e., the amplitude or frequency) drops to zero, the controller determines that the mouse has stopped moving (i.e., has changed direction) and that the velocity of the mouse is zero. In another embodiment, the controller determines that the mouse or control device has stopped moving when the amplitude or frequency, or combination thereof, falls below a preset threshold. The controller is configured to correct the drift for the velocity for the time at which the vibration stops. In one embodiment, the controller is configured to set the velocity to zero when the vibration stops. According to a further embodiment of the present invention, the velocity of the mouse is correlated to the frequency at which the mouse vibrates as the mouse is moved. Since a vibration typically consists of energy distributed over a range of frequencies (vibration spectrum), the frequency of vibration is meant in the following as the dominant frequency in the spectrum, or another attribute of the spectrum including but not limited to, center frequency, and maximum frequency in the spectrum, etc. According to one embodiment, the controller is configured to compare the velocity determined from integrating the acceleration with the velocity determined from the frequency, and if the two velocities are the same, the controller is configured to correct the drift in the velocity.

According to one embodiment, the controller is configured to determine the averaged velocity of the mouse by calculating an average of the velocity determined from the measured acceleration ($V_{acceleration}$) multiplied by a first weighting factor ($W_1$) and the velocity determined from the frequency of the vibration ($V_{vibration}$) of the mouse weighted by a second weighting factor ($W_2$). In an embodiment, the averaged velocity can be determined by the following:

$$V_{average} = \frac{W_1 V_{acceleration} + W_2 V_{vibration}}{W_1 + W_2}.$$

The weight factors $W_1$ and $W_2$ may be varied by the controller to place a higher emphasis on $V_{acceleration}$ or $V_{vibration}$. The average velocity described above is sometimes referred to as a weighted-average velocity. A distance travelled by the mouse may be determined from $V_{average}$ by integrating $V_{average}$ over time. $V_{average}$ may be calculated over time as $V_{vibration}$ and $V_{acceleration}$ are calculated over time.

For example, if relatively high acceleration is detected by the inertial system, the velocity calculated from this high acceleration may have a relatively high accuracy with a relatively low drift. The drift of the velocity is relatively low because the signal to noise ratio of the acceleration to noise is relatively high, and the accumulated error in integrating the acceleration over time is relatively low. Therefore, for calculating $V_{average}$ for relatively high accelerations of the mouse, relatively higher weight may be placed on $V_{acceleration}$ as compared to $V_{vibration}$ because $V_{acceleration}$ has a relatively high accuracy. Alternatively, if relatively low acceleration is detected by the inertial system, the velocity calculated from integrating this low acceleration may have a relatively low accuracy with a relatively high drift. The drift is relatively high because the signal to noise ratio of the acceleration to noise is relatively low, and the accumulated error in integrating the acceleration over time is relatively high. Therefore, for calculating $V_{average}$ for relatively low accelerations of the mouse, relatively higher weight may be placed on $V_{vibration}$ as compared to $V_{acceleration}$ because $V_{acceleration}$ has a relatively lower accuracy.

Figure 3:
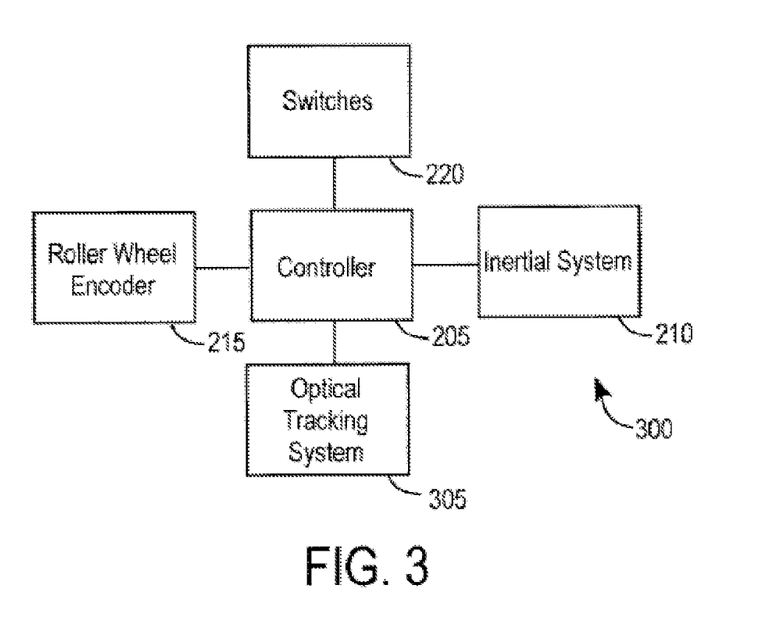
FIG. 3 is a simplified schematic of a circuit included in the mouse shown in FIG. 1 according to alternative embodiment of the present invention.

FIG. 3 is a simplified schematic of a circuit 300 included in mouse 105 according to another embodiment of the present invention. Circuit 300 differs from circuit 200 described above in that circuit 300 includes an optical tracking system 305 configured to track movement of the mouse across a surface. It is to be noted that other tracking systems may be included in the mouse instead of an optical tracking system, such as a mechanical tracking system, an opto-mechanical tracking system, etc. Optical tracking systems, as are well understood by those of skill in the art, are configured to direct radiation, such as light, at a surface and image the surface or image the light itself (e.g., image the laser speckle) as the mouse is moved. Temporally consecutive images of the surface or the light are compared by the controller to determine the movement (velocity and distance traveled) of the mouse. According to one embodiment, the optical tracking system in combination with the controller may be configured to track movement of the mouse on glass or the like by detecting dirt on the surface of the glass and comparing temporally consecutive images of the dirt on the glass to determine movement.

Optical tracking systems tend to provide relatively high accuracy in velocity and distance traveled measurements for relatively low speed movement of the mouse relative to a surface, and tend to provide relatively lower accuracy in velocity and distance traveled measurements for relatively high speed movement of the mouse relative to a surface. Oppositely, the inertial system tends to provide for relatively lower accuracy in velocity and distance traveled determinations for relatively low speed movement of the mouse, and tends to provide for relatively higher accuracy in velocity and distance traveled determinations for relatively high speed movement of the mouse relative to a surface.

In some environments, optical tracking systems may provide a relatively low accuracy for velocity and distance measurements. For example, if the optical tracking system is tracking on fairly clean glass, then the optical tracking system may provide velocity and distance traveled measurements that have relatively low accuracy. For example, the reported velocity and distance traveled might be zero. Further, if the optical tracking system is tracking on an uneven surface, such as a user's pant leg, then the optical tracking system may provide velocity and distance measurements that have relatively low accuracy. In such situations, the inertial system will generally not provide for a velocity and distance traveled determination as far off as the optical tracking system.

According to one embodiment, if the measurements for velocity and distance traveled provided by the optical tracking system differ by more than a predetermined percentage (as determined by the controller) from the velocity and distance determination provided by the inertial system, then the controller may be configured to transfer to the computer the velocity and distance traveled determinations provided by the inertial system. Alternatively, if the velocity and distance traveled measurement provided by the optical tracking system are the same or differ less than the predetermined percentage from the velocity and distance traveled determination provided by the inertial system, then the controller may be configured to transfer to the computer the velocity and distance traveled determinations measured by the optical tracking system. The predetermined percentage can be determined in a variety of ways. For instance, the predetermined percentage may be empirically determined based on movement of the mouse across clean glass or the like, may be pre-set, or may be set by the user, and so on.

According to a further embodiment, if the velocity and distance traveled measurements provided by the optical tracking system differ less than the predetermined percentage from the velocity and distance traveled determination by the inertial system, then the controller may correct for the drift of the inertial system using the velocity measured by the optical tracking system.

In another embodiment, the controller may be configured to average the calculations for velocity from the optical tracking system and the inertial system. The controller may be configured to calculate a weighted-average velocity from the two determined velocities, as described above. The controller may also be configured to average the determinations for the distance traveled by the mouse, such as by calculating a weighted-average of the determined distances traveled. Alternatively, the distance traveled may be calculated from the weighted-average velocity.

In other embodiments, tracking movement, velocity, and acceleration on a non-planar surface is performed by one or more tracking methods including optical tracking, inertial tracking, and/or vibrational tracking, as described above. Any hybrid combination of tracking methods may be performed with appropriately weighted factors to achieve a predetermined accuracy. For example, optical tracking systems tend to track the velocity of a control device more accurately than the inertial system, according to an embodiment of the invention. In an embodiment, a non-planar surface is detected by the controller (e.g., using the accelerometer data) and when such a non-planar surface is detected, more weight is given to the optical system than to the inertial system. The described combination or hybridization of tracking methods depends on the type of surface, speed of movement, etc. and would be known and appreciated by one of ordinary skill in the art with the benefit of this disclosure.

Additional description related to the measurement of position, including detection of displacement over varied surfaces is provided in U.S. patent application Ser. No. 11/471,084, filed on Jun. 20, 2006, and entitled "Optical Displacement Detection Over Varied Surfaces" and U.S. patent application Ser. No. 11/522,834, filed on Sep. 18, 2006 and entitled "Optical Displacement Detection Over Varied Surfaces," the disclosures of which are hereby incorporated by reference in their entirety for all purposes.

Figure 4:
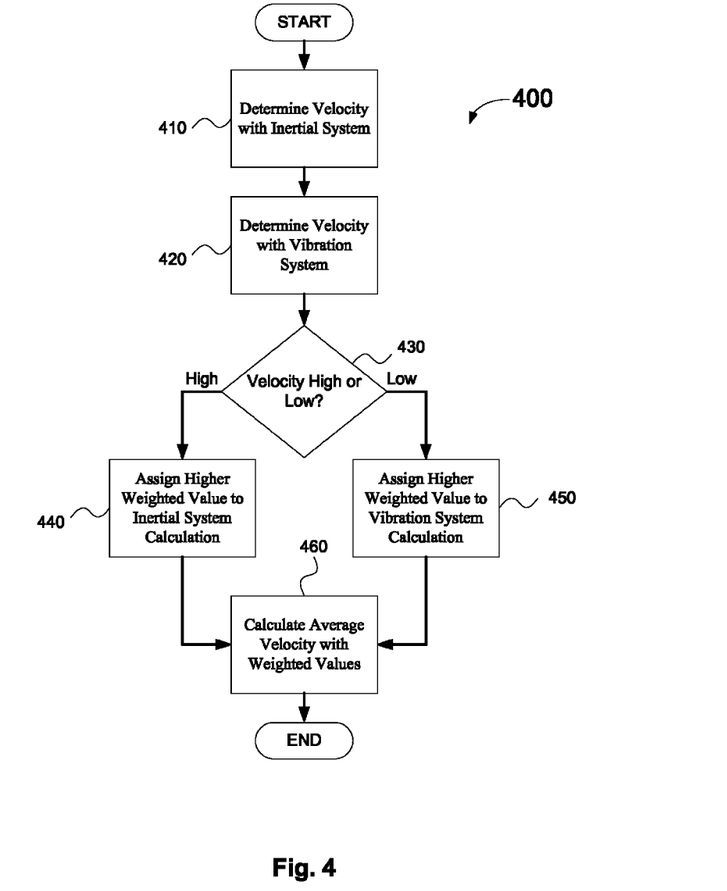
FIG. 4 is a simplified flow diagram illustrating a method for calculating an average velocity of a control device according to an embodiment of the present invention.

In alternative embodiments, velocity tracking systems or combinations of tracking systems may be used to calculate the velocity. For example, in one embodiment, the method described in relation to FIG. 4 is configured with an optical system and inertial system with associated weighted factors with magnitudes based on a predetermined threshold value. Other combinations may be used and any number of systems may be combined as required by the application.

In another embodiment, cursor movement is stopped in response to a detection of z-axis movement of the control device. For example, a cursor on a display stops moving when a control device (e.g., a mouse) is lifted off of a surface. More specifically, the processor (e.g., controller 205) inhibits cursor movement upon detection of movement in the z-direction. This may be desirable if a user moves a mouse to the edge of a mouse pad and lifts the mouse to place it back in the center of the mouse pad to continue movement. The z-axis movement may be detected by an accelerometer (e.g., MEMS accelerometer) or other method of detecting lift-off of a control device known to those of ordinary skill in the art with the benefit of this disclosure.

FIG. 4 is a simplified flow diagram illustrating a method 400 for calculating an average velocity of a control device 115 according to an embodiment of the present invention. The method 400 is performed by processing logic that may comprise hardware (circuitry, dedicated logic, etc.), software (such as is run on a general purpose computing system or a dedicated machine), firmware (embedded software), or any combination thereof. In one embodiment, the method is performed by the controller 205. In another embodiment, the controller 205 is a control circuit.

Referring to FIG. 4, the method 400 includes determining the velocity of the control device 115 as measured by the inertial system (410). As described above, the inertial system may include one or more MEMS accelerometers for the x-axis, y-axis, or z-axis, where the velocity is determined by integrating the measured acceleration of the control device. The controller 205 determines the velocity of the control device 115 as measured by the vibration system (420). The processing logic determines if the velocity of the control device 115 is above or below a predetermined threshold velocity (430). As described above, in some embodiments, the inertial system tends to provide greater accuracy at relatively high velocities, according to an embodiment of the present invention. In contrast, in some embodiments the vibration system tends to provide greater accuracy at relatively low velocities. In one embodiment, the predetermined threshold velocity is a value at approximately a midpoint velocity between relatively high and low velocities. The predetermined threshold would be known and appreciated by one of ordinary skill in the art with the benefit of this disclosure. In one embodiment, the threshold can be set by the user. In an embodiment, determining the velocity with the inertial system may occur before, after, or substantially simultaneously as determining the velocity with the vibrational system.

In an embodiment, the processing logic (e.g., control circuit) assigns a higher weighted value the weight factor associated with the inertial system velocity measurement if the velocity of the control device 115 is above the predetermined threshold (440). In contrast, the processing logic assigns a lower weighted value to the weight factor associated with the vibration system velocity measurement if the velocity of the control device 115 is above the predetermined threshold. The processing logic calculates the average velocity with the weighted values (460). The appropriate weighted values assigned to each system would be known and appreciated by one of ordinary skill in the art with the benefit of this disclosure.

In an embodiment, the processing logic (e.g., control circuit) assigns a higher weighted value to the weight factor associated with the vibration system velocity measurement if the velocity of the control device 115 is below the predetermined threshold (450). In contrast, the processing logic assigns a lower weighted value to the weight factor associated with the inertial system velocity measurement if the velocity of the control device 115 is below the predetermined threshold. The processing logic calculates the average velocity with the weighted values (460). The appropriate weighted values assigned to each system would be known and appreciated by one of ordinary skill in the art with the benefit of this disclosure.

In one embodiment, the controller 205 calculates the average velocity based on both the inertial and vibration velocity measurements with their associated weighted values, as described more fully throughout the present specification. In one embodiment, the distance traveled is determined by integrating the average velocity. Other formulas may be used to calculate a velocity or distance traveled in a hybrid system, as described herein, and would be known and appreciated by those of ordinary skill in the art with the benefit of this disclosure.

It should be appreciated that the specific steps illustrated in FIG. 4 provide a particular method of calculating an average velocity of a control device according to an embodiment of the present invention. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 5:
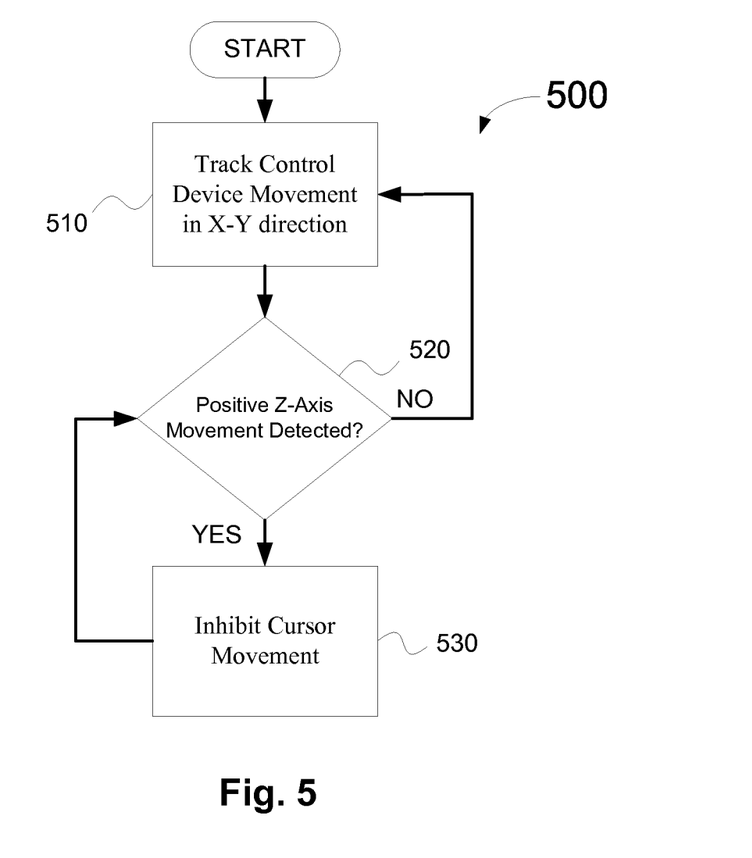
FIG. 5 is a simplified flow diagram illustrating a method for inhibiting cursor movement when z-axis movement is detected in a control device according to an embodiment of the present invention.

FIG. 5 is a simplified flow diagram illustrating a method for inhibiting cursor movement when z-axis movement is detected in a control device according to an embodiment of the present invention. The method 500 is performed by processing logic that may comprise hardware (circuitry, dedicated logic, etc.), software (such as is run on a general purpose computing system or a dedicated machine), firmware (embedded software), or any combination thereof. In one embodiment, the method is performed by the controller 205. In another embodiment, the controller 205 is a control circuit.

Referring to FIG. 5, method 500 includes the controller 205 tracking the movement of control device 115 in the x-axis and y-axis (510). If the controller 205 detects movement in the z-axis (i.e., vertical movement) (520), the controller 205 inhibits cursor movement until z-axis movement is no longer detected (530). If z-axis movement is no longer detected (520), x-y tracking recommences (510). In another embodiment, the controller 205 tracks movement in only one direction (e.g., the x-axis or y-axis) and inhibits cursor movement when detecting z-axis movement.

In addition to detecting lift-off in a binary fashion (i.e., lift-off or no lift-off), method 500 may be configured to detect the amount of z-axis travel based on z-axis accelerometer measurements. In one embodiment, the z-axis accelerometer is a MEMS accelerometer. In other embodiments, non-accelerometer based technologies may be used to perform lift-off detection which would be known and appreciated by one of ordinary skill in the art with the benefit of this disclosure.

It should be appreciated that the specific steps illustrated in FIG. 5 provide a particular method of inhibiting cursor movement when z-axis movement is detected in a control device according to an embodiment of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

Additional description related to the measurement of lift-off is provided in U.S. patent application Ser. No. 12/051,975, filed on Mar. 20, 2008, entitled "System and Method for Accurate Lift-Detection of an Input Device" which is hereby incorporated by reference in its entirety for all purposes.

Figure 6:
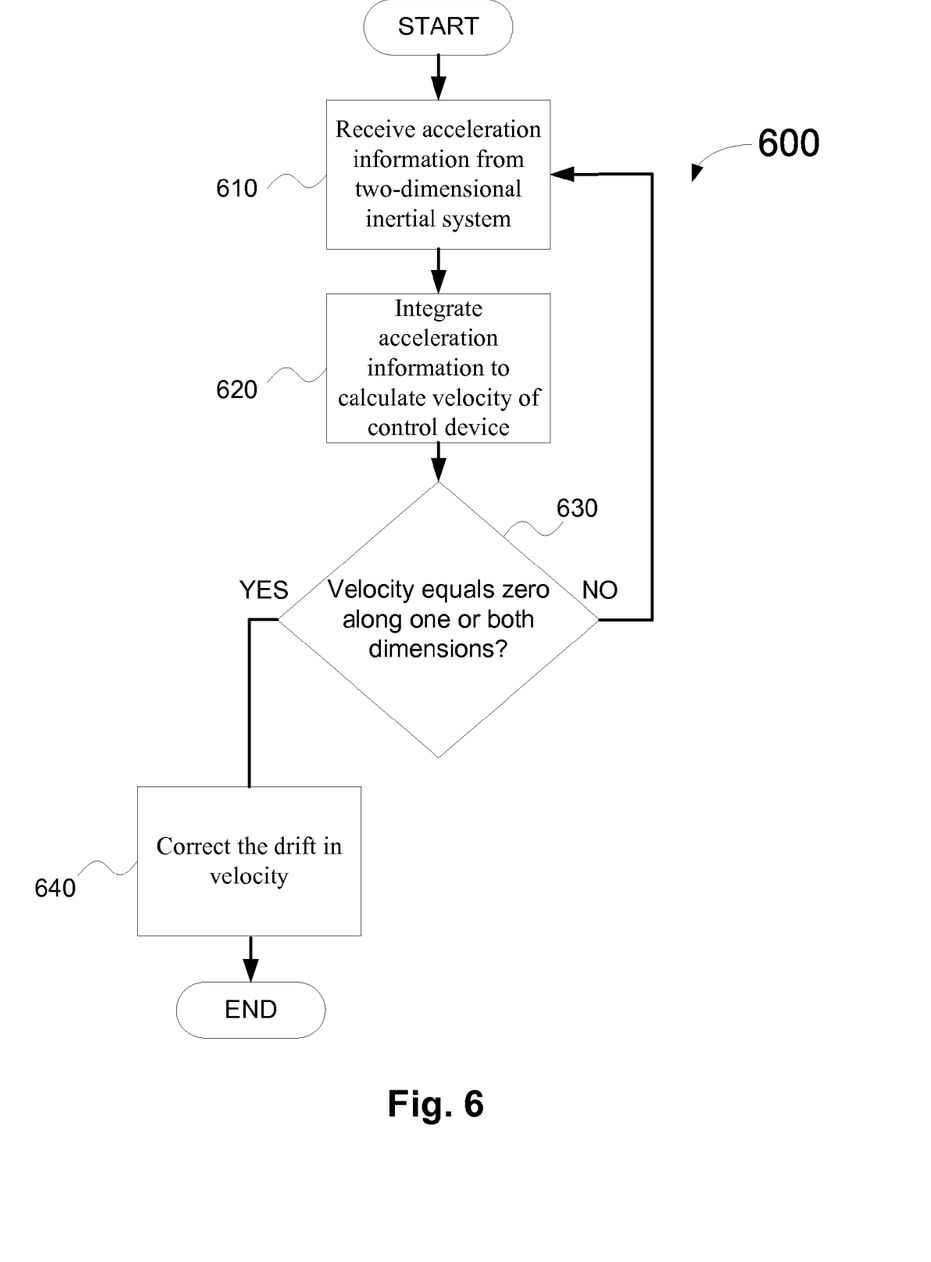
FIG. 6 is a simplified flow diagram illustrating a method for correcting drift in a control device according to an embodiment of the present invention.

FIG. 6 is a simplified flow diagram illustrating a method for correcting drift in a control device according to an embodiment of the present invention. The method 600 is performed by processing logic that may comprise hardware (circuitry, dedicated logic, etc.), software (such as is run on a general purpose computing system or a dedicated machine), firmware (embedded software), or any combination thereof. In one embodiment, the method is performed by the controller 205. In another embodiment, the controller 205 is a control circuit.

Referring to FIG. 6, method 600 includes the controller 205 receiving acceleration information for the acceleration measured by a two-dimensional inertial system in a control device (610). According to an embodiment, the two-dimension inertial system may operate in two directions orthogonal to one another and parallel to a bottom surface of the control device. In another embodiment, the control device comprises a three-dimensional inertial system which may include inertial detection in the x-axis, y-axis, and z-axis, as described above. The controller 205 calculates the velocity of the control device by integrating the acceleration information (620). If the velocity calculated by the control device 205 equals zero in one or both dimensions in the two-dimensional inertial system (630), the controller 205 corrects the drift in the velocity calculation (640). If the velocity calculated by the control device 205 does not equal zero in one or both dimensions, the method returns to the beginning (610).

It should be appreciated that the specific steps illustrated in FIG. 6 provide a particular method of correcting the drift of a two-dimensional inertial system according to an embodiment of the present invention. Other sequences of steps may also be performed according to alternative embodiments. For example, alternative embodiments of the present invention may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

It is to be understood that the examples and embodiments described above are for illustrative purposes only, and that various modifications or changes in light thereof will be suggested to persons skilled in the art, and are to be included within the spirit and purview of this application and scope of the appended claims. For example, while the specification discusses that various calculations are performed by the mouse's controller, the various calculation may be performed by other elements, such as a host, the control device's dongle, or the like. Therefore, the above description should not be understood as limiting the scope of the invention as defined by the claims.

What is claimed is:

1. A control device comprising:
a two-dimensional inertial system configured to measure acceleration of the control device;
a control circuit coupled to the two-dimensional inertial system wherein the control circuit is configured to:
receive acceleration information for the acceleration measured by the two-dimensional inertial system,
integrate the acceleration information to calculate a velocity of the control device,
determine if the velocity of the control device becomes zero along one or both of the two dimensions for which the two-dimensional inertial system is configured to measure acceleration, and
correct a drift in the velocity if the control circuit determines that the velocity is zero along one or both of the two dimensions, and
a vibration detection system configured to detect a vibration of the control device as the control device moves across a surface,
wherein one or both of an amplitude and frequency of the vibration are correlated to the velocity of the control device,
wherein the control circuit is configured to average a weighted sum of the velocities determined from the one or more of the amplitude and the frequency of the vibration and the velocity determined by the control circuit from the acceleration information,
wherein the control circuit is configured to weight more the velocity determined from the one or more of the amplitude and the frequency of the vibration if the acceleration is at or below a threshold acceleration, and
wherein the control circuit is configured to weight more the velocity determined by the control circuit from the acceleration information if the acceleration is above the threshold acceleration.

2. The control device of claim 1 wherein the velocity along one or both of the two dimensions is zero if the control device changes a direction of motion under user control.

3. The control device of claim 1 wherein the inertial system includes microelectromechanical systems (MEMS) accelerometers operable to measure acceleration of the control device along the two dimensions.

4. The control device of claim 1 wherein the two dimensions are parallel to a bottom of the control device.

5. The control device of claim 1 wherein the control device is a mouse or a remote control.

6. The control device of claim 1 wherein the control circuit is configured to correct the drift of the velocity if the control circuit detects that one or more of an amplitude and a frequency of the vibration falls below a preset value.

7. The control device of claim 6 wherein if the velocity determined from the vibration is the same as the velocity determined by the control circuit, the control circuit is configured to correct the drift of the velocity determined by the control circuit from the acceleration information.

8. A method comprising:
receiving acceleration data corresponding to an acceleration of a control device measured by a two-dimensional inertial system;
calculating a first velocity of the control device based on the acceleration data;

receiving vibration data from a vibration detection system configured to detect a vibration of the control device as the control device moves across a surface, determining a second velocity of the control device based on one or both of an amplitude and frequency of the vibration; and determining an average velocity of the control device based on the first and second calculated velocities, wherein the control circuit weights more the second velocity if the acceleration data indicates that the acceleration of the control device is at or below a threshold acceleration, and wherein the control circuit weights more the first velocity if the acceleration data indicates that the acceleration of the control device is above the threshold acceleration.

9. A control device comprising:

a control circuit;

a two-dimensional inertial system coupled to the control circuit and configured to measure an acceleration of the control device, wherein the control circuit calculates a first velocity based on the measured acceleration of the two-dimensional inertial system;

a vibration detection system coupled to the control circuit and configured to detect a vibration of the control device as the control device is moved along a work surface, wherein the control circuit calculates a second velocity based on at least one of an amplitude or frequency of the vibration, wherein the control circuit calculates an average of a weighted sum of the first and the second velocities, wherein the control circuit weighs the first velocity more than the second velocity if the measured acceleration is above a predetermined threshold acceleration, and wherein the control circuit weighs the second velocity more than the first velocity if the measured acceleration is at or below the predetermined threshold acceleration.

* * * * *